United States Patent [19]

Tanuma

[11] Patent Number: 5,581,569
[45] Date of Patent: Dec. 3, 1996

[54] SOLID STATE LASER APPARATUS

[75] Inventor: Ryohei Tanuma, Kanagawa, Japan

[73] Assignee: Fuji Electric Co., Ltd., Tokyo, Japan

[21] Appl. No.: 420,500

[22] Filed: Apr. 12, 1995

[30] Foreign Application Priority Data

Apr. 12, 1994 [JP] Japan ................................ 6-072980

[51] Int. Cl.$^6$ ........................................................ H01S 3/16
[52] U.S. Cl. ................................................. 372/41; 372/66
[58] Field of Search ................................ 372/18, 34, 41, 372/66

[56] References Cited

U.S. PATENT DOCUMENTS 4,713,820  12/1987  Morris et al. .............................. 372/41

OTHER PUBLICATIONS

"CV Laser Operation of Nd:YLF" by Pollak et al.; IEEE Journal of Quantum Electronics, vol. QE–18, No. 2, Feb. 1982, pp. 159–163.

*Primary Examiner*—Rodney B. Bovernick
*Assistant Examiner*—Robert E. Wise
*Attorney, Agent, or Firm*—Brumbaugh, Graves, Donohue & Raymond

[57] ABSTRACT

A solid state laser apparatus includes a laser medium of a uniaxial crystal, such as a fluoride crystal, having a negative temperature variation ratio of refractive index, laser diodes for optically pumping the laser medium, a set of mirrors positioned at two longitudinal ends of the laser medium for oscillating the light in the laser medium and outputting a beam, and a system for cooling the laser medium. The thermal lens effect is suppressed by causing a thermal gradient to exist along only one chosen axis of the laser medium and eliminating the thermal lens diopter along the chosen axis by optimizing a ratio L/D of length L and diameter D of the laser medium.

17 Claims, 4 Drawing Sheets

SOLID STATE LASER APPARATUS

BACKGROUND OF THE INVENTION

The present invention relates generally to a solid state laser apparatus, and more particularly to a solid state laser apparatus which emits a laser beam from an optically-pumped solid laser medium.

Applications of solid state lasers encompass various fields, such as laser machining applications, measurement, medical science, etc., because of their small size and easiness of handling and operation. However, several problems still exist with the current solid state lasers. For example, a critical problem is reducing the effects caused by heat generated in the solid laser medium. Since the solid state laser apparatus usually cools its rod-shaped laser medium from the circumference of the laser rod, the laser rod has a high temperature in the center of the laser rod and a low temperature in the periphery. In the most popular YAG laser, this temperature gradient causes a convex lens effect where the refractive index is high in the center of the YAG rod, since the temperature variation rate of refractive index dn/dT of YAG is positive. Adding the effect of thermal expansion in the center of rod end face, the laser medium itself shows the convex lens effect, which is called "thermal lens effect."

The thermal lens effect prevents convergence of laser beam, and hinders the creation of a high quality laser beam. Thus, it is necessary to reduce the thermal lens effect as much as possible in order to produce a high quality laser beam.

A well known method for solving this problem involves using a slab solid state laser medium. A first pair of oppositely-facing side faces of the solid state laser slab are optically polished. The laser beam is then propagated in a zig-zag path through the laser slab repeating total reflection on the optically polished side faces. This zig-zag light path cancels the thermal lens effect in the direction perpendicular to the reflection plane. Additionally, the thermal lens effect in the direction perpendicular to a second pair of oppositely-facing side faces may be avoided by tightly covering the second pair of faces with heat insulators so as to minimize the temperature gradient in the direction perpendicular to the second pair of faces.

The above-described solution is effective in obtaining a high quality laser beam in the zig-zag propagation direction. However, it is difficult to improve beam quality in the direction parallel to the total reflection planes by using the slab laser medium, since it is impossible in practice to perfectly insulate the side faces of the slab laser medium thermally, and since optical properties in the direction parallel to the total reflection planes depend on thermal stress and thermal deformation of the total reflection planes.

Another known method for suppressing the thermal lens effect uses laser diodes (LDs) for pumping the laser media in place of excitation lamps which have been used widely. Since the LDs emit light only at a frequency which is effective for laser pumping, the laser beam from the LDs generates less heat in the laser media and effectively suppresses the thermal lens effect. However, the heat generated by the LDs is reduced, at the most, to only about one third of the heat generated by the excitation lamps, and further improvement is unexpected.

Yet another prior art method utilizes laser crystals with a negative dn/dT for suppressing the thermal lens effect. A negative dn/dT causes a concave lens effect which cancels the convex lens effect caused by swelling of the end faces of the solid laser medium. Crystals with a negative dn/dT include, e.g., $LiYF_4$ doped with $Nd^{3+}$ (cf. J. E. Murray: IEEE J. Quantum Electron., Vol. QE-19 (1983) pp. 488–491, H. Vanherzeele: Optic Letters, Vol. 13 (1988) pp. 369–371, G. Cerullo, et al.: Optics Communications, Vol. 93 (1992) pp. 77–81, etc.), Er:YLF (cf. R. C. Stoneman, et al.: IEEE J. Quantum Electron., Vol. 28 (1992) pp. 1041–1045), Tm:Ho:YLF (cf. B. T. Mcguckin, et al.: IEEE J. Quantum Electron., Vol. 28 (1992) pp. 1025–1028), Cr:LiSAF ($LiSrAlF_6$), and Cr:LiCAF ($LiCaAlF_6$) (Cr:LiSAF and Cr:LiCAF: cf M. D. Perry, et al.: Laser Focus World, September (1993) pp. 85–92). However, even though the thermal lens effect in a particular direction in a plane perpendicular to the propagation direction of the laser beam may be eliminated through the use of crystals with a negative dn/dT, the thermal lens effect in other directions fin the perpendicular plane remains uncancelled, since the optical properties of the crystals vary depending on the particular direction in the plane perpendicular to the laser beam propagation direction.

SUMMARY OF THE INVENTION

The present invention provides a solid state laser apparatus having a laser medium of a uniaxial crystal with negative temperature variation of refractive index, an optic axis of which uniaxial crystal lies in a plane perpendicular to a propagation direction of a laser beam. Additionally, the laser medium has a ratio L/D of length L and a representative diameter D of the laser medium, representative diameter D being either the diameter or width of the laser medium, which ratio is set at a value which substantially eliminates thermal lens diopter in a direction of the optic axis or in a direction perpendicular to the optic axis in the perpendicular plane. The laser medium is cooled in such a manner that a temperature gradient exists only along the direction in which thermal lens diopter is substantially eliminated. It is preferable to sandwich the laser medium between two metal heat sinks for cooling.

Accordingly, the present invention eliminates thermal lens diopter in one direction by adjusting the ratio of the laser medium length to the laser medium diameter (L/D), and cools the laser medium so that a temperature gradient exists only along this direction. Although a thermal lens diopter remains in directions perpendicular to the direction along which the temperature gradient exists, thermal lens effect is eliminated in all the directions since no temperature gradient exists along the directions perpendicular to the direction along which the temperature gradient exists.

The present invention also provides a solid state laser apparatus having a laser medium of a uniaxial crystal with negative temperature variation of refractive index, an optic axis of which laser crystal coincides with a propagation direction of a laser beam.

Since the laser beam is not affected by optical anisotropy, thermal lens diopter remains constant irrespective of directions. Thus, by setting a ratio L/D of length L and a representative diameter D of the laser medium at a value which eliminates thermal lens diopter the thermal lens effect may be eliminated completely. In this case the emitted light polarizes at random, as long as a polarizer is not inserted in a resonator.

It is an object of the present invention to provide a solid state laser apparatus which produces a high quality laser beam.

It is another object of the present invention to provide a solid state laser apparatus which does not exhibit the thermal lens effect.

It is yet another object of the present invention to provide a solid state laser apparatus having a laser medium with no thermal lens diopter along a direction of the optic axis or along a direction perpendicular to the optic axis, which laser medium exhibits a temperature gradient only along the direction in which no thermal lens diopter exists.

It is still another object of the present invention to provide a solid state laser apparatus having a laser medium in which the optic axis coincides with the propagation direction of the laser beam, which laser medium has a ratio of length to representative diameter which eliminates thermal lens diopter.

BRIEF DESCRIPTION OF THE DRAWINGS

FIG. 1(*b*) is a longitudinal cross section of the first embodiment of a solid state laser apparatus according to the present invention taken along line A—A of FIG. 1(*a*).

FIG. 1(*c*) is a lateral cross section of the first embodiment of a solid state laser apparatus according to the present invention taken along line C—C of FIG. 1(*b*).

FIG. 2(*b*) is a longitudinal view of the second embodiment of a solid state laser apparatus according to the present invention taken along line A—A of FIG. 2(*a*).

FIG. 2(*c*) is a longitudinal view of the second embodiment of a solid state laser apparatus according to the present invention taken along line C—C of FIG. 2(*b*);

FIG. 3(*b*) is a longitudinal cross section of the third embodiment of a solid state laser apparatus according to the present invention taken along line A—A of FIG. 3(*a*).

FIG. 3(*c*) is a lateral cross section of the third embodiment of a solid state laser apparatus according to the present invention taken along line C—C of FIG. 3(*b*)

FIG. 4(*b*) is a longitudinal cross section of the fourth embodiment of a solid state laser apparatus according to the present invention sectional view taken along line A—A of FIG. 4(*a*).

FIG. 4(*c*) is a lateral cross section of the fourth embodiment of a solid state laser apparatus according to the present invention taken along line C—C of FIG. 4(*b*).

DETAILED DESCRIPTION

Figure 1A:
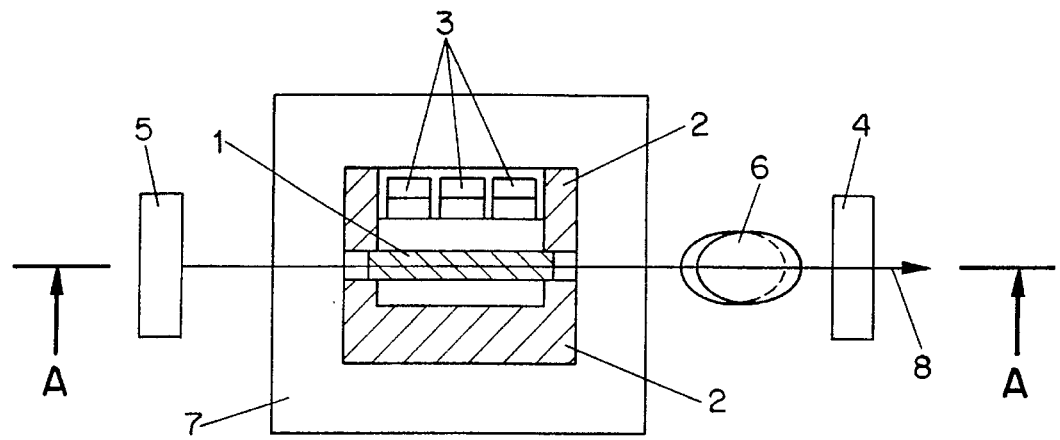
FIG. 1 (*a*) is a top view cross section of the first embodiment of a solid state laser apparatus according to the present invention taken along line B—B of FIG. 1(*b*).

A thermal lens diopter is the inverse of the focal length f of a lens effect caused by heat generated in a rod of an isotropic laser crystal. As defined by W. Koechner in *Solid-State Laser Engineering*, p. 390 (3d ed., Springer-Verlag 1992), the thermal lens diopter 1/f is characterized in the following Equation 1:

$$1/f \propto (P_{in}/V)(LA+DB) \quad (1)$$

In Equation (1):

f is the focal length of a thermal lens, $P_{in}$ is the input power,

V is the rod volume,

L is the rod length,

D is the rod diameter,

A is the refractive index change in response to temperature and thermal stress, and B is a concave lens effect caused by expansion of an end face of the rod.

Quantities A and B in Equation 1 are defined by Equations (2-1) and (2-2):

$$A=(\tfrac{1}{2})(dn/dT)+\alpha C n_o^3 \quad (2\text{-}1)$$

$$B=\alpha(n_o-1)/2 \quad (2\text{-}2)$$

In Equations (2-1) and (2-2):

dn/dT is the temperature variation ratio of refractive index, $n_o$ is the refractive index in rod center, α is the thermal expansion coefficient, and C is the photoelastic coefficient.

Usually, A has a negative value when dn/dT is negative since the absolute value of direct temperature dependence of the refractive index of the first term of Equation (2-1) is larger than that of temperature dependence of the refractive index of the second term caused through photoelasticity. On the other hand, since B is positive, the effects of the first and the second terms of Equation (2-1) cancel one another to reduce the thermal lens effect.

The present invention exploits characteristics of Equation 1 for thermal lens diopter in which L and D act independently of A and B, respectively. Though A and B are material constants the values of which cannot be controlled, L and D are determined by the shape of the laser medium. Therefore, by optimizing the values of A and B, the quantity LA plus the quantity DB may be brought to zero (LA+DB=0), which results in zero thermal lens diopter.

Most of the known laser crystals which show negative dn/dT are uniaxial. These laser crystals are used with their optic axis oriented perpendicular to the propagation direction of the laser beam. Since these crystals' thermal expansion coefficient α and photoelastic coefficient C each vary as a function of a particular direction in a plane perpendicular to the propagation direction of the laser beam, the value of A shows anisotropy because of the perpendicular arrangement between the optic axis and the laser beam's propagation direction. Therefore, it is impossible to eliminate the thermal lens diopter in all the directions by adjusting L/D.

A first preferred embodiment of a solid state laser apparatus according to the present invention, shown in FIGS. 1(*a*)–1(*c*) exploits the above-described principles. A laser medium 1 is a square rod of Nd:YLF crystal, which is sandwiched between two copper heat sinks 2. The heat sinks 2 in turn mounted on a water cooled heat sink 7. An array of laser diodes 3 for optical pumping is disposed on one side face of the laser medium 1. A partially transparent output mirror 4 is placed near a first end face of the laser medium 1, and a total reflection mirror 5 is placed near a second end face of the laser medium 1 and opposite the output mirror 4.

In the embodiment shown in FIGS. 1(*a*)–1(*c*), the crystallographic c-axis of Nd:YLF crystal coincides with its optic axis. As shown in FIG. 1(*c*), the crystallographic c-axis (optic axis) of the crystal is vertically aligned, perpendicular to the propagation direction of an output laser beam 8. In the Nd:YLF crystal, the ordinary ray and the extraordinary ray oscillate at different frequencies in this crystal.

Figure 1B:
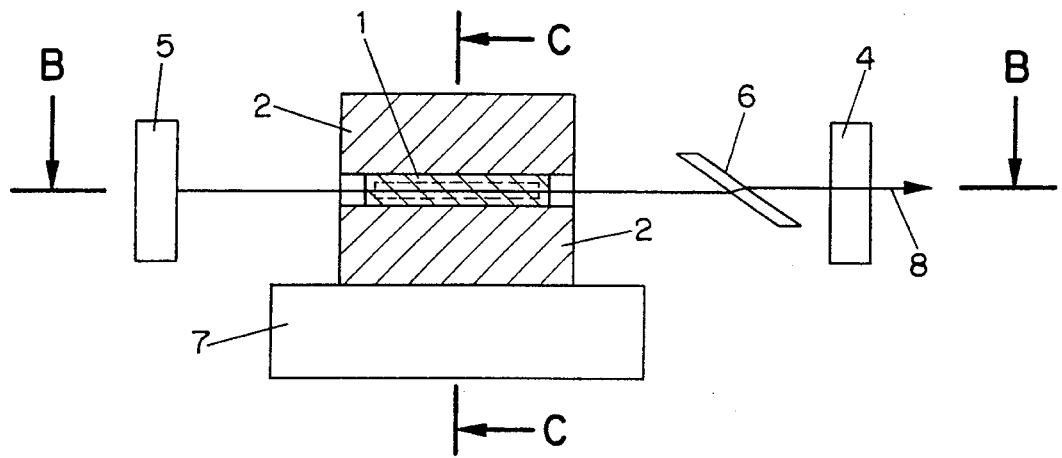
Figure 1C:
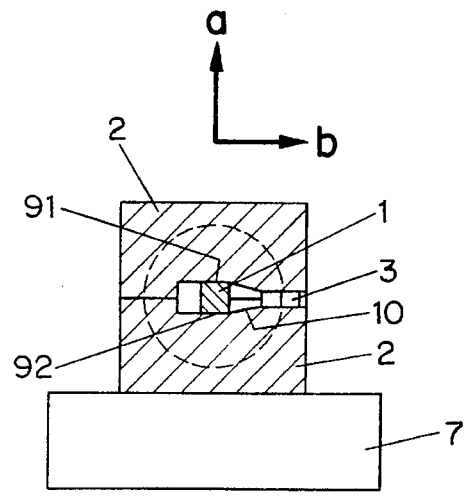

In the embodiment shown in FIGS. 1(a)–1(c), a Brewster plate 6 (or Brewster's window) is arranged so as to obtain an extraordinary ray, the polarization plane of which is parallel to the optic axis. The wavelength λ of the emitted light is 1047 nm. Additionally, the ratio of length L and width D of the Nd:YLF rod 1 is adjusted so that the thermal lens diopter in the c-axis direction is zero.

The Nd:YLF rod 1 is soldered to the heat sinks 2 with indium along contact areas 91 and 92 to ensure thermal contact. A water path, which is not shown in FIGS. 1(a)–1(c), is formed in the water cooled heat sink 7. Pumping light from the LD array 3 impinges on the Nd:YLF rod 1 directly or after being reflected by an inside face 10 of the heat sink 2. The inside face 10 of the heat sink 2 is plated with gold so as to minimize reflection loss. Excited laser light oscillates between the partially transparent output mirror 4 and the total reflection mirror 5, and the laser beam output 8 is obtained.

Since two side faces other than the side areas 91 and 92 of the rod 1 contact air, heat generated in the rod 1 is dissipated mostly through the contact areas 91 and 92. Therefore, temperature gradient in the rod 1 is generated only in the c-axis direction. Further, since the thermal diopter is eliminated in the c-axis direction as described above, the temperature gradient in the c-axis direction does not cause any thermal lens effect. Thermal lens diopter remaining in a direction perpendicular to the c-axis does not cause any thermal lens effect, since temperature gradient is not generated substantially zero in the perpendicular direction. Thus, the first embodiment of the present invention eliminates the thermal lens effect almost completely, and facilitates obtaining a high quality output laser beam.

Figure 2A:
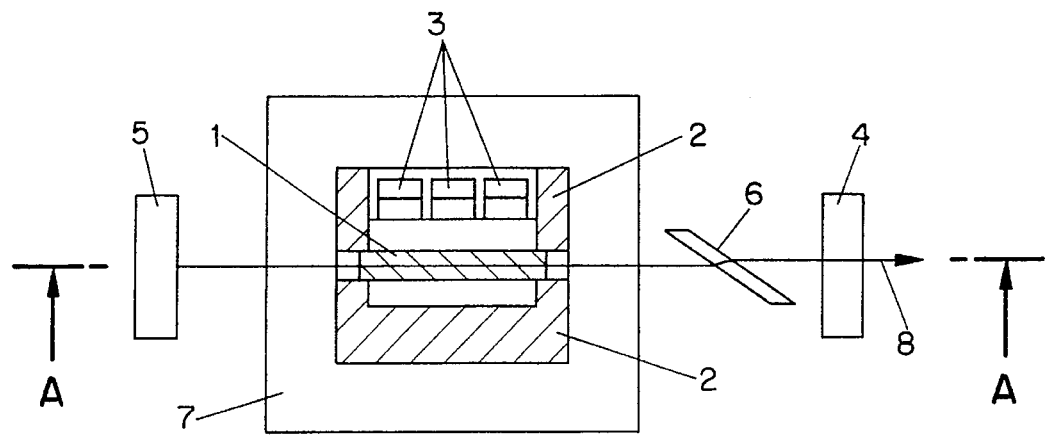
FIG. 2(*a*) is a top view cross section of the second embodiment of a solid state laser apparatus according to the present invention taken along line B—B of FIG. 2(*b*).
Figure 2B:
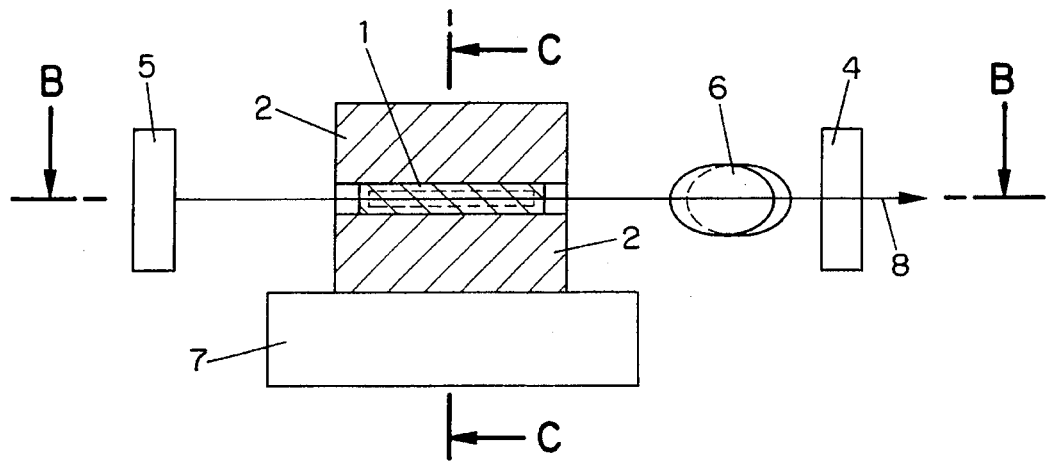
Figure 2C:
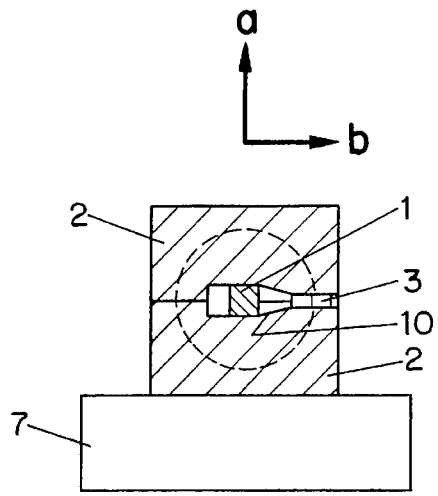

Shown in FIGS. 2(a)–2(c) is a second embodiment of a solid state laser according to the present invention. In FIGS. 2(a)–2(c), parts substantially identical to those of FIGS. 1(a)–1(c) are designated by the same reference numerals. The only difference between the configurations of FIGS. 1(a)–1(c) and 2(a)–2(c) is the orientation of the Brewster's window 6. In FIG. 2(a), the Brewster plate 6 is rotated 90° around the axis defined by the propagation direction of the output laser beam 8, from the orientation shown in FIG. 1(a). The polarization plane for the embodiment shown in FIGS. 2(a)–2(c) is thus perpendicular to the c-axis. The wavelength λ of the emitted light is 1053 nm. Since L/D is adjusted so that the thermal lens diopter is zero in the c-axis direction, a temperature gradient is caused to exist only in the c-axis direction without causing a thermal lens effect.

Figure 3A:
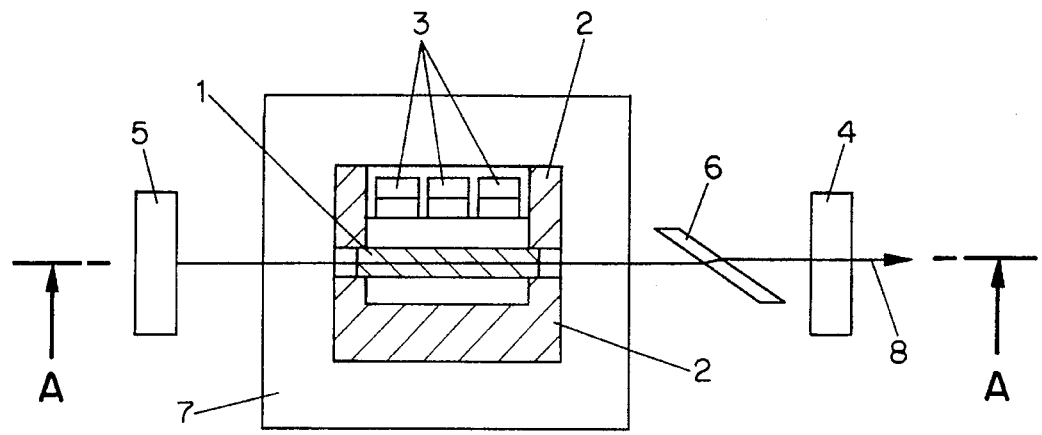
FIG. 3(*a*) is a top view cross section of the third embodiment of a solid state laser apparatus according to the present invention taken along line B—B of FIG. 3(*b*).
Figure 3B:
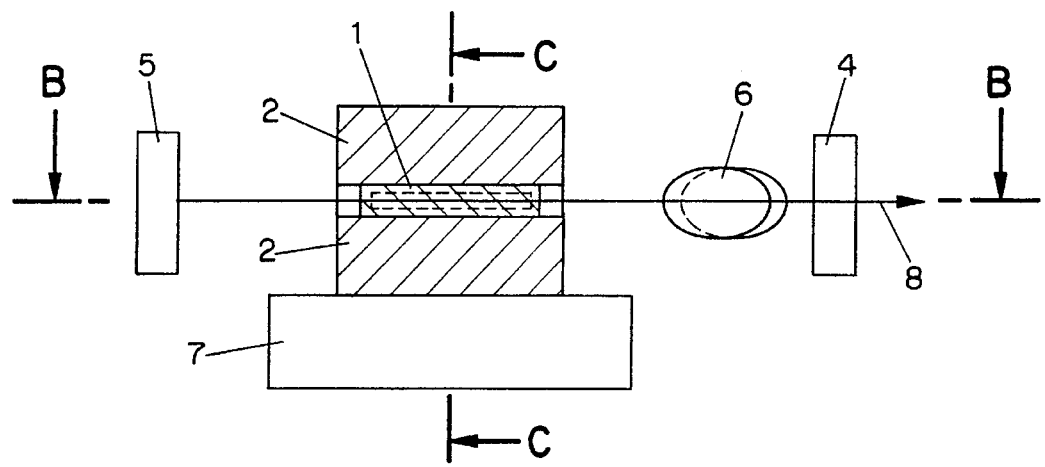
Figure 3C:
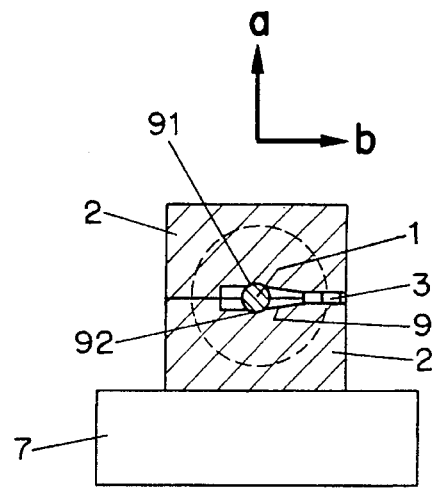

Shown in FIGS. 3(a)–3(c) is a third embodiment of a solid state laser apparatus according to the present invention. In FIGS. 3(a)–3(c), parts substantially identical to those of FIGS. 1(a)–1(c) and 2 are designated by the same reference numerals. The main difference between the configurations of the embodiment shown in FIGS. 3(a)–3(c) from the first two embodiments is that the third embodiment uses a cylindrical Nd:YLF rod. This creates a circular beam, while the first and the second embodiments produce a square beam from a square rod.

In the embodiment of FIG. 3(a), the orientation of the Brewster's window 6 is the same as the orientation of the Brewster plate in FIG. 2(a), and the wavelength λ of the emitted light is 1053 nm. However, by orienting the Brewster's window 6 of FIG. 3(a) in the same orientation of FIG. 1(a), an output laser beam wavelength λ of 1047 nm is obtained. Additionally, contact 91 and 92 of the circular rod crystal 1 and the heat sinks 2 are aligned along the c-axis of the rod crystal. Though temperature gradient is not always limited strictly along the c-axis direction in the circular rod, the thermal lens diopter is adjusted to zero by approximating the temperature gradient as linearly as practical. In the third embodiment, ratio L/D is calculated by using the rod diameter as D.

Although the direction in which the temperature gradient is created is selected to be the c-axis of the Nd:YLF crystal in the first three embodiments, the direction of the temperature gradient may be set along the b-axis and L/D adjusted so that the thermal lens diopter in the b-axis direction is zero.

Figure 4A:
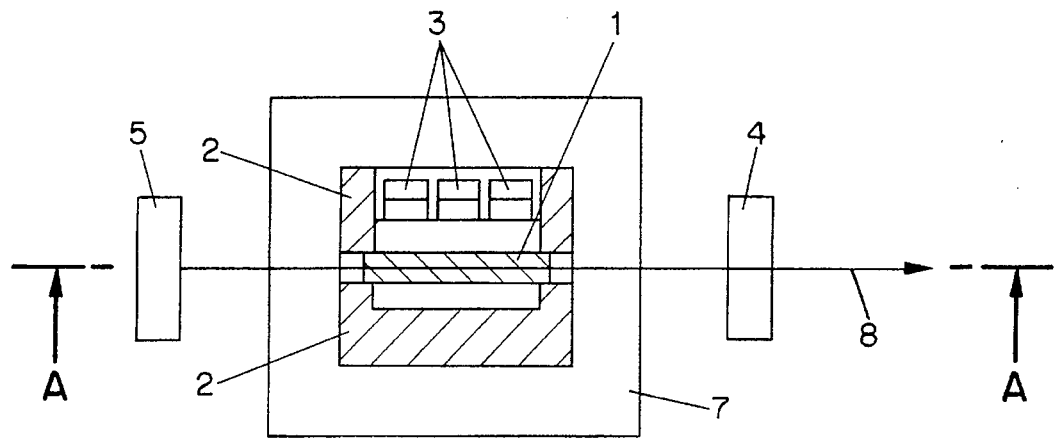
FIG. 4(*a*) is a top view cross section of the fourth embodiment of a solid state laser apparatus according to the present invention taken along line B—B of FIG. 4(*b*).
Figure 4B:
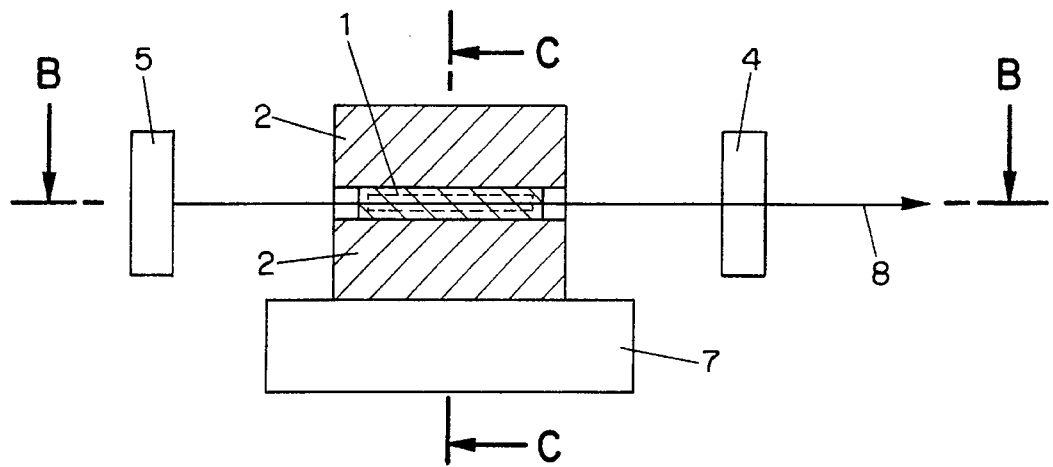
Figure 4C:
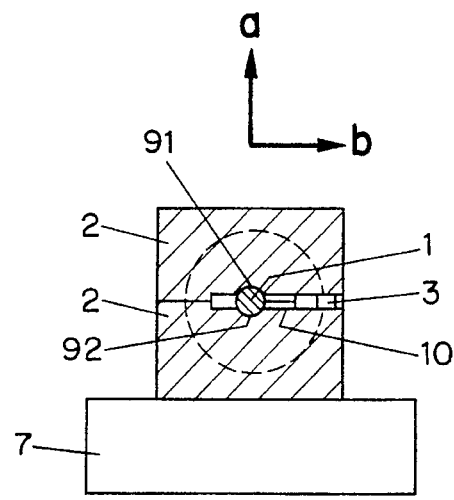

Shown in FIGS. 4(a)–4(c) is a fourth embodiment of a solid state laser apparatus according to the present invention. In FIGS. 4(a)–4(c), the parts substantially identical to those of FIGS. 1(a)–3(c) are designated by the same reference numerals. In the fourth embodiment, the laser beam propagates in the crystallographic c-axis direction. Since the c-axis of the fourth embodiment is the optic axis of the Nd:YLF crystal, tilted by 90° from the electric vector of the laser beam irrespective of polarization plane of the laser beam, an output laser beam is obtained only at the wavelength λ of 1053 nm.

In the fourth embodiment, since optical anisotropy is not exhibited along the c-axis direction, the thermal lens diopter is uniform irrespective of directions. Therefore, by optimizing L/D, the thermal lens effect is eliminated in all the directions. Furthermore, since it is not necessary to generate a one dimensional temperature gradient in the fourth embodiment, the contact areas 91 and 92 of the cylindrical rod 1 and the heat sinks 2 are increased as much as possible to increase the cooling efficiency.

While the present invention has been described in conjunction with the preferred embodiments, it should be understood that the preferred embodiments are exemplary in nature and should not be construed as limiting the scope of protection for the invention as set forth in the appended claims. Other modifications and revisions should be readily apparent to those of ordinary skill in the art. For example, though the present invention has been explained so far by way of the example of an Nd:YLF laser crystal, other fluoride crystals such as $Er^{3+}$-doped Er:YLF, Tm/Ho:YLF doped with $Tm^{3+}$ and $Ho^{3+}$, $Cr^{3+}$-doped Cr:LiSAF and $Cr^{3+}$-doped Cr:LiCAF, may be used for the laser medium 1.

I claim:

1. A solid state laser apparatus for emitting a light wave, which comprises:

a laser medium of length L and one of diameter and width D having a negative ratio of refractive index variation to temperature variation, wherein said optic axis of said laser medium lies in a plane perpendicular to a propagation direction of said light wave and said laser medium having a ratio L/D which eliminates thermal lens diopter in one of a direction of said optic axis of said laser medium and a perpendicular direction thereto in said plane, and a temperature gradient is created in said direction;

a means for optically pumping said laser medium to generate said light wave in said laser medium;

a total-reflection means disposed at first end of said laser medium; and a partially transparent mirror disposed at second end of said laser medium, said light wave being reflected between said optically pumping means and said total-reflection means before being emitted from said second end of said laser medium and passing through said partially transparent mirror.

2. The solid state laser apparatus of claim 1, wherein said laser medium comprises a uniaxial crystal.

3. The solid state laser apparatus of claim 2, further comprising cooling means for cooling the laser medium.

4. The solid state laser apparatus of claim 3, wherein said uniaxial crystal comprises a fluoride crystal selected from the group consisting of $Nd^{3+}$-doped $LiYF_4$, $Er^{3+}$-doped $LiYF_4$, $LiYF_4$ doped with $Tm^{3+}$ and $Ho^{3+}$, $Cr^{3+}$-doped $LiSrAlF_6$, and $Cr^{3+}$-doped $LiCaAlF_6$.

5. The solid state laser apparatus of claim 2, further comprising a means for plane-polarizing said light wave emitted from said second end of said laser medium, said plane-polarizing means being disposed between said second end of said laser medium and said partially transparent mirror.

6. The solid state laser apparatus of claim 5, wherein said plane-polarizing means is oriented so that plane-polarized light wave emerging from the plane-polarizing means has a polarization plane which is parallel to the optic axis of said laser medium.

7. The solid state laser apparatus of claim 6, wherein said plane-polarizing means comprises a Brewster's window.

8. The solid state laser apparatus of claim 7, wherein said optically pumping means comprises a laser diode.

9. The solid state laser apparatus of claim 8, further comprising cooling means for cooling the laser medium, wherein said uniaxial crystal comprises a fluoride crystal selected from the group consisting of $Nd^{3+}$-doped $LiYF_4$, $Er^{3+}$-doped $LiYF_4$, $LiYF_4$ doped with $Tm^{3+}$ and $Ho^{3+}$, $Cr^{3+}$-doped $LiSrAlF_6$, and $Cr^{3+}$-doped $LiCaAlF_6$.

10. The solid state laser apparatus of claim 5, wherein said plane-polarizing means is oriented so that plane-polarized light wave emerging from the plane-polarizing means has a polarization plane which is perpendicular to the optic axis of said laser medium.

11. The solid state laser apparatus of claim 10, wherein said plane-polarizing means comprises a Brewster's window.

12. The solid state laser apparatus of claim 11, wherein said optically pumping means comprises a laser diode.

13. The solid state laser apparatus of claim 12, further comprising cooling means for cooling the laser medium, wherein said uniaxial crystal comprises a fluoride crystal selected from the group consisting of $Nd^{3+}$-doped $LiYF_4$, $Er^{3+}$-doped $LiYF_4$, $LiYF_4$ doped with $Tm^{3+}$ and $Ho^{3+}$, $Cr^{3+}$-doped $LiSrAlF_6$, and $Cr^{3+}$-doped $LiCaAlF_6$.

14. A solid state laser apparatus for emitting a light wave, which comprises:

a laser medium of length L and one of diameter and width D having a negative ratio of refractive index variation to temperature variation, said laser medium having a ratio L/D which eliminates thermal lens diopter, wherein said optic axis of said laser medium coincides with a propagation direction of said light wave;

means for optically pumping said laser medium to generate said light wave in said laser medium;

total-reflection means disposed at first end of said laser medium; and a partially transparent mirror disposed at second end of said laser medium.

15. The solid state laser apparatus of claim 14, wherein said laser medium further comprises a uniaxial crystal.

16. The solid state laser apparatus of claim 15, further comprising cooling means for cooling said laser medium.

17. The solid state laser apparatus of claim 16, wherein said uniaxial crystal comprises a fluoride crystal selected from the group consisting of $Nd^{3+}$-doped $LiYF_4$, $Er^{3+}$-doped $LiYF_4$, $LiYF_4$ doped with $Tm^{3+}$ and $Ho^{3+}$, $Cr^{3+}$-doped $LiSrAlF_6$, and $Cr^{3+}$-doped $LiCaAlF_6$.

* * * * *